United States Patent [19]
Yamamoto

[11] Patent Number: 6,066,046
[45] Date of Patent: May 23, 2000

[54] VIDEO GAME APPARATUS, PREDICTION GUIDE DISPLAYING METHOD IN VIDEO GAME, AND COMPUTER READABLE RECORDING MEDIUM RECORDING THEREIN A PREDICTION GUIDE DISPLAY PROGRAM

[75] Inventor: Daisuke Yamamoto, Kokubunji, Japan

[73] Assignee: Konami Co., Ltd., Hyogo-ken, Japan

[21] Appl. No.: 09/201,438

[22] Filed: Nov. 30, 1998

[30] Foreign Application Priority Data

Dec. 17, 1997 [JP] Japan ..................................... 9-348272

[51] Int. Cl.[7] ...................................................... G09B 9/00
[52] U.S. Cl. ................................................ 463/7; 434/28
[58] Field of Search .................................. 463/2, 3, 4, 5, 463/7, 31; 273/317.1, 317.2; 434/28

[56] References Cited

U.S. PATENT DOCUMENTS

| | | | |
|---|---|---|---|
| 4,504,055 | 3/1985 | Wells | 273/85 G |
| 4,660,828 | 4/1987 | Weiss . | |
| 4,976,435 | 12/1990 | Shatford et al. . | |
| 5,947,819 | 9/1999 | Ohshima | 463/2 |

FOREIGN PATENT DOCUMENTS 0807903  11/1997  European Pat. Off. .
WO9111792  8/1991  WIPO .

*Primary Examiner*—Valencia Martin-Wallace
*Assistant Examiner*—John Paradiso
*Attorney, Agent, or Firm*—Jordan and Hamburg LLP

[57] ABSTRACT

Disclosed is a video game apparatus which enhances a realism of a ski-jumping competition by displaying a changing wind direction as a prediction guide. In the video game apparatus, a wind data operating unit obtains a wind direction and a wind speed. The amount of change in the wind direction changes in the form of a sine curve, and the wind speed also changes in the form of a sine curve. A wind data display control unit displays a wind direction guide and a wind speed guide on a screen. The wind direction guide uses an arrow, and the wind speed guide is displayed by the thickness of the arrow. A run-up control unit allows a competitor of the game to start the run-up when a first left button is operated. An attitude control unit controls the flight distance of ski-jumping by controlling the height of the competitor with the influence of wind direction and wind speed, and the flight direction of the competitor obtained from corrected conditions by the leftward and rightward keys. Also disclosed are a prediction guide displaying method in the video game, and a computer readable recording medium storing therein a prediction guide display program.

9 Claims, 11 Drawing Sheets

VIDEO GAME APPARATUS, PREDICTION GUIDE DISPLAYING METHOD IN VIDEO GAME, AND COMPUTER READABLE RECORDING MEDIUM RECORDING THEREIN A PREDICTION GUIDE DISPLAY PROGRAM

BACKGROUND OF THE INVENTION

1. Field of the Invention

The present invention relates to a video game apparatus which uses a computer readable recording medium, such as an optical disc, a magnetic disc, and a semiconductor memory in which program data is stored, a prediction guide displaying method in a video game, and a computer readable recording medium storing therein a prediction guide display program.

2. Description of the Related Art

A large number of game systems have been conventionally proposed and used, such as a system consisting of a special machine for home use and a television monitor, and a system consisting of a special machine for business use, a personal computer or a work station, a display, and a sound output machine.

These systems are composed of a controller to be operated by a player, a recording medium storing therein game program data, a CPU for effecting control for the production of sounds and images on the basis of the game program data, a processor for producing images, a processor for producing sounds, a CRT for displaying images, and a speaker for outputting sounds. A CD-ROM, a semiconductor memory, a cassette containing a semiconductor memory, and the like are frequently used as the above computer readable recording medium.

As an example of game performed by such a game system, a game may be considered such that a simulated ski-jumping hill is included within a game space, and a character of the game displayed on a display means is made to imitate a ski-jumping competitor competing for scores of a jump.

In general, in such a game, a competitor displayed on the display means is instructed to start the run-up on a ski-jumping hill using, for example, buttons of a controller and then, the competitor is instructed to jump using the same or a different button of the controller when the competitor reaches the takeoff position of an inrun of the ski-jumping hill.

In this case, if the wind direction which changes according to present contents, for example, is displayed on the display means so that the flight distance of the jump changes according to the wind direction at the time of takeoff, the player controls the timing at which instruction of the start of the run-up is made using the changing wind direction as a prediction guide. Thus, a video game having the realism of the actual ski-jumping competition can be achieved.

SUMMARY OF THE INVENTION

It is an object of the present invention to provide a video game apparatus in which the realism of a ski-jumping competition is enhanced by displaying the changing wind direction as a prediction guide, a prediction guide displaying method in a video game, and a computer readable recording medium storing therein a prediction guide display program.

According to a first aspect of the present invention, there is provided a video game apparatus in which a simulated ski-jumping field is displayed on a game picture, a character of the game is allowed to start a run-up from a start point, to perform a takeoff action at a takeoff position, and to jump so as to compete for a flight distance, the apparatus comprising: wind direction setting means for setting a wind direction that changes according to preset change contents; wind direction guide display control means for displaying a wind direction guide indicating the set wind direction on a part of the game picture; run-up instruction means for instructing the character to start the run-up action; and flight distance control means for changing the flight distance in response to the wind direction at the point of time of the takeoff action.

According to a second aspect of the present invention, there is provided a prediction guide displaying method for use in a video game in which a simulated ski-jumping field is displayed on a game picture, a character of the game is allowed to start a run-up from a start point, to perform a takeoff action at a takeoff position, and to jump so as to compete for a flight distance, the method comprising the steps of: displaying a wind direction guide indicating a wind direction which changes according to preset change contents on a part of a game picture; instructing said character to start a run-up action; and changing the flight distance in response to the wind direction at the point of time of the takeoff action.

According to a third aspect of the present invention, there is provided a computer readable recording medium storing therein a prediction guide display program, the prediction guide display program being used in a video game in which a simulated ski-jumping field is displayed on a game picture, a character of the game is allowed to start a run-up from a start point, to perform a takeoff action at a takeoff position, and to jump so as to compete for a flight distance and the program comprising the steps of: setting a wind direction which changes according to preset change contents; displaying a wind direction guide indicating the set wind direction on a part of a game picture; instructing the character to start a run-up action; and changing the flight distance in response to the wind direction at the point of time of the takeoff action.

With the above arrangements, a wind direction which changes according to preset change contents is set, a wind direction guide indicating the set wind direction on a part of a game picture. When a character of the game is instructed to start a run-up action, the character starts a run-up from a start point and performs a takeoff action at a takeoff position to jump. Since the wind direction changes according to the preset change contents, the wind direction at the point of time of the takeoff action can be predicted by the wind direction when instructing the start of the run-up action, so that the wind direction guide functions as a prediction guide.

In the video game apparatus of the present invention, the wind direction setting means may rotate the wind direction. With this arrangement, the timing at which instruction of the start of the run-up can be selected from the wind direction in the direction of 360°.

In addition, in the video game apparatus of the present invention, wind setting means for setting a wind speed that changes according to preset change contents may be further included, the wind direction guide display control means may further display a wind speed guide indicating the set wind speed on a part of the game picture, and the flight distance control means may further change the flight distance in response to a wind speed at the point of time of the takeoff action. With the above arrangements, it is necessary to consider both the wind direction and the wind speed when providing the timing at which instruction of the start of the run-up is made, so that the video game can be made more complex to enhance the interest thereof.

Furthermore, in the video game apparatus of the present invention, the wind speed setting means may set change contents thereof so as to be in a fixed relationship with the change contents of the wind direction. With this arrangement, it is necessary to consider the relationship between the change in wind direction and the change in wind speed when providing the timing at which instruction of the start of the run-up is made, so that the video game can be made even more complex to enhance the interest thereof.

Still furthermore, in the video game apparatus of the present invention, the wind direction guide display control means may display an arrow mark as the wind direction guide and change the shape of the arrow mark in response to the wind speed. With the arrangements, both the wind direction and the wind speed can be sensibly known only by the arrow mark, so that the interest of the video game can be further enhanced.

In addition, in the video game apparatus of the present invention, the wind direction setting means may reduce an amount of change in the wind direction at the point of time of the takeoff action when the wind direction is at least in the best direction. With this arrangement, the start of the run-up can be easily instructed when the wind direction is in the best direction, so that interest of a video game for competing for flight distance can be further enhanced.

Furthermore, in the video game apparatus of the present invention, takeoff instruction means for instructing the character of the game to perform the takeoff action may be further included. With this arrangement, the wind direction can be controlled by adjusting the instruction point of time of the takeoff action, whereby the flight distance can be changed, and the video game can be made even more complex to enhance the interest thereof.

DESCRIPTION OF THE PREFERRED EMBODIMENT

Figure 1:
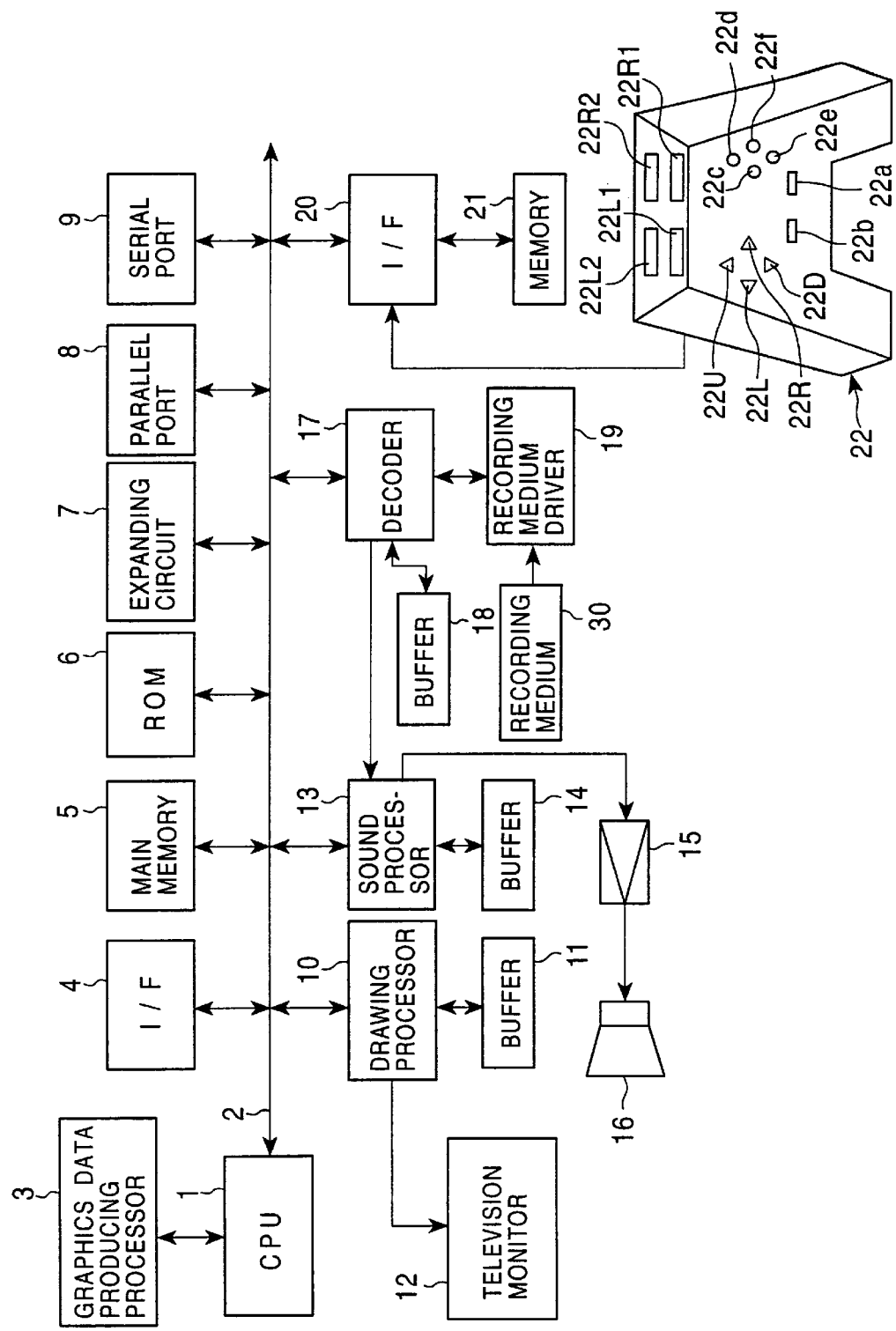
FIG. 1 is a block diagram showing a game system according to an embodiment of the present invention.

Referring to FIG. 1, a game system consists of a game machine main body and a recording medium 30 storing therein program data. The game machine main body consists of a CPU 1, a bus 2 consisting of an address, data and a control bus that are connected to the CPU 1, and components connected to the bus 2.

A graphics data producing processor 3, an interface circuit 4, a main memory 5, a ROM 6, an expanding circuit 7, a parallel port 8, a serial port 8, a drawing processor 10 and a buffer 11, a sound processor 13 and a buffer 14, a decoder 17 and a buffer 18, an interface circuit 20 and a memory 21 are connected to the bus 2.

In addition, a television monitor 12 is connected to the drawing processor 10, a speaker 16 is connected to the sound processor 13 via an amplifier 15, a recording medium driver 19 is connected to the decoder 17, and a memory 21 and a controller 22 are connected to the interface circuit 20.

The form of the above game system varies with its use. When the above game system is constructed for home use, the television monitor (hereinafter, referred to as a "monitor") 12 and the speaker 16 are separated from the game machine main body.

When the above game system is constructed for business use, all the components shown in FIG. 1 are accommodated in a single integrated housing.

When the above game system is constructed on the basis of a personal computer or a workstation, the monitor 12 corresponds to a computer display, the drawing processor 10, the sound processor 13, and the expanding circuit 7 respectively correspond to a part of program data recorded in the recording medium 30 or hardware on an expansion board mounted on an expansion slot of the computer, the interface circuit 4, the parallel port 8, the serial port 9 and the interface circuit 20 correspond to the hardware on the expansion board mounted on the expansion slot of the computer, and the buffers 11, 14 and 18 respectively correspond to the main memory 5 or each of areas of a non-illustrated extended memory.

In this embodiment, a description will be given of a case where the above game system is constructed for home use.

A description will now be given of the components shown in FIG. 1.

The graphics data producing processor 3 functions as, so to speak, a coprocessor of the CPU 1. That is, the graphics data producing processor 3 performs coordinate transformation and light-source calculation, such as arithmetic operation of matrix or vector of a fixed-point type, by parallel processing. The graphics data producing processor 3 mainly performs processing in which the address in a displaying area of an image to be processed is obtained on the basis of coordinate data, moving amount data and rotation amount data of each of the apexes of image data in a two-dimensional or three-dimensional plane, and the address data is returned to the CPU 1 again; and processing in which luminance of the image is calculated in response to the distance from a virtually set distance from the light source.

The interface circuit 4 is used for an interface of peripheral devices, for example, pointing devices such as a mouse and a track ball. ROM 6 stores program data as an operating system for the game system. The program data corresponds to a BIOS (Basis Input Output System) in a personal computer.

The expanding circuit 7 subjects compressed images compressed by intra-encoding based on MPEG (Moving Picture Expert Group) with respect to moving pictures or JPEG (Joint Picture Expert Group) with respect to still pictures to expansion processing. Examples of the expansion processing include decoding processing (decoding of data encoded VLC: Variable Length Code), inverse quantization processing, IDCT (Inverse Discrete Cosine Transform) processing, and reconstituting processing of intra images.

The drawing processor 10 performs drawing processing to the buffer 11 on the basis of a drawing command issued by the CPR 1.

The buffer 11 consists of a displaying area and a non-displaying area. The displaying area is an expansion area for the data displayed on a display surface of the monitor 12.

In this embodiment, the non-displaying area is a storage area for data for defining a skeleton, model data for defining a polygon, animation data for allowing a model to perform motions, pattern data showing contents of each of animations, texture data, color palette data, and so forth.

The texture data is two-dimensional image data. The color palette data is the data for designating colors of the texture data. The color palette data and the texture data are recorded once or a plurality of times in advance by the CPU 1 from the recording medium 30 into the non-displaying area of the buffer 11 in conformity with the progress of the game.

Examples of the drawing command include a drawing command for drawing a three-dimensional image using a polygon, and a drawing command for drawing a normal two-dimensional image. The polygon means a two-dimensional image of the polygon. In this embodiment, a triangle or a tetragon is used in this embodiment.

The drawing command for drawing a three-dimensional image using a polygon consists of polygon apexes address data on the displaying area of the buffer 11, texture address data indicating storage positions on the buffer 11 of the texture data to be pasted onto the polygon, color palette address data indicating storage positions on the buffer 11 of the color palette data indicating the colors of the texture data, and luminance data indicating luminance of the texture.

The polygon apexes address data is obtained by the graphics data producing processor 3 by subjecting polygon apexes coordinate data on the three-dimensional space from the CPU 1 to coordinate transformation on the basis of moving amount data and rotation amount data of the screen, thereby being replaced with two-dimensional polygon apexes coordinate data. In addition, the luminance data is determined by the graphics data producing processor 3 on the basis of the distance between the position indicated by the polygon peak coordinate data from the CPU 1 after being subjected to the coordinate transformation and the virtually arranged light source.

The polygon apexes address data indicates the address on the displaying area of the buffer 11. The drawing processor 10 writes the texture data corresponding to the range of the displaying area of the buffer 11 indicated by three or four items of the polygon peak address data.

One object is constituted by a number of polygons. The CPU 1 stores the coordinate data of the polygons on three-dimensional space in the buffer 11 in relation to the vector data of the corresponding skeleton. When the character is moved on the displaying surface by the operation of the controller 22, i.e., when the motion of the character is represented or when the visual point position for viewing the character is changed, the following processing is performed.

The CPU 1 supplies three-dimensional coordinate data of the apexes of the polygons that is held in the non-displaying area of the buffer 11, and moving amount data and rotation amount data obtained from the coordinate of the skeleton and data of its rotation amount to the graphics data producing processor 3.

The graphics data producing processor 3 sequentially obtains three-dimensional coordinate data of the polygons after movement and after rotation, on the basis of the three-dimensional coordinate data of the apexes of the polygons and moving amount data and rotation amount data of the polygons.

Coordinate data in horizontal and vertical directions of the thus obtained three-dimensional coordinate data of the polygons are supplied as address data on the displaying area of the buffer 11, i.e., as polygon apexes address data, to the drawing processor 10.

The drawing processor 10 writes texture data indicated by the texture address data that is allocated in advance onto the triangle or tetragonal displaying area of the buffer 11 indicated by the three or four items of polygon apexes address data. This allows an object having a large number of polygons onto which texture data is attached to be displayed on the display surface of the monitor 12.

The drawing command for drawing normal two-dimensional images consists of apexes address data, texture address data, color palette address data indicating storage positions of the color palette data indicating the colors of the texture data on the buffer 11, and luminance data indicating luminance of the texture. The apexes address data is the coordinate data obtained by the graphics data producing processor 3 by subjecting apexes address data on the two-dimensional plane from the CPU 1 to coordinate transformation on the basis of the moving amount data and rotation amount data from the CPU 1.

The sound processor 13 enters ADPCM data read out of the recording medium 30 in the buffer 14, and uses the ADPCM data stored in the buffer 14 as a sound source. Then, the sound processor 13 reads out the ADPCM data on, for example, a 4.41-KHz clock.

Then, the sound processor 13 subjects the ADPCM data read out of the buffer 14 to processes, such as transformation of pitches, addition of noises, setting of envelope, setting of level, addition of reverberation, and the like.

When the sound data read out of the recording medium 30 is PCM data such as CD-DA data (Computer Disk Digital Audio), the sound data is converted into ADPCM data by the sound processor 13.

The processing of the PCM data by the program data is directly performed on the main memory 5. The PCM data processed on the main memory 5 is supplied to the sound processor 13 to be converted into the ADPCM data and is subjected to the above various types of processing and then, is output as a sound from the speaker 16.

Examples of the recording medium driver 19 include a CD-ROM drive, a hard disk drive, a flexible disk drive, a silicon disk drive, a cassette medium reading machine, and the like.

Examples of the recording medium 30 include a CD-ROM, an optical disk, a flexible disk, a semiconductor memory, and the like.

The recording medium driver 19 reads out images, sounds, and program data from the recording medium 30, and supplies them to the decoder 17. The decoder 17 subjects the reproduced data from the recording medium driver 19 to error-correction processing by ECC (Error Correction Code), and supplies the processed data to the main memory 5 or the sound processor 13.

The main memory 21 consists of, for example, a holder and a card-type memory. The card-type memory maintains various game parameters, such as a state at the completion of the game.

The controller 22 includes, as externally operable operating means, a first left button 22L1, a second left button 22L2, a first right button 22R1, a second right button 22R2, an upward key 22U, a downward key 22D, a leftward key 22L, a rightward key 22R, a start button 22a, a select button 22b, a first button 22c, a second button 22d, a third button 22e and a fourth button 22f, and is operated by a game player.

The upward key 22U, the downward key 22D, the leftward key 22L, and rightward key 22R are used by a game player to give commands to the CPU 1 for moving a character on the screen upward and downward, and leftward and rightward.

The start button 22a is used by the game player for instructing the CPU 1 to start game program data loaded from the recording medium 30. The select button 22b is used by the game player for instructing the CPU 1 to make various selections relating to the game program data loaded from the recording medium 30 to the main memory 5.

Functions of the first left button 22L1, the second left button 22L2, the first right button 22R1 and the second right button 22R2 vary with the game program data loaded from the recording medium 30.

A brief operation of the game system will now be described.

A power switch (not shown) is turned on, and the power of the game system is turned on. When the recording medium 30 is loaded in the recording medium driver 19, the CPU 1 instructs, on the basis of the operating system stored in the ROM 6, the recording medium driver 19 to read out the program data from the recording medium 30. This allows the recording medium driver 19 to read out images, sounds, and program data from the recording medium 30.

The read-out images, sounds and program data are supplied to the decoder 17 to be subjected to the error-correction processing therein. The image data subjected to error-correction in the decoder 17 is supplied to the expanding circuit 7 via the bus 2 to be subjected to the expansion processing and then, is supplied to the drawing processor 10, and is written in the non-displaying area of the buffer 11 by the drawing processor 10.

The sound data subjected to the error-correction processing in the decoder 17 is supplied to the main memory or the sound processor 13, and is written in the main memory 5 or the buffer 14.

The program data subjected to the error-correction processing in the decoder 17 is supplied to the main memory 5, and is written in the main memory 5. Thereafter, the CPU 1 advances the game on the basis of the program data stored in the main memory 5, and contents instructed by the game player via the controller 22. In other words, the CPU 1 suitably performs control of the image processing, control of sound processing, and control of internal processing.

In this embodiment, examples of the control of image processing include calculation of coordinates of skeletons or calculation of apexes coordinate data of polygons from pattern data applicable to animations instructed to the character, supply of the thus obtained three-dimensional coordinate data and visual point position data to the graphics data producing processor 3, and issuance of drawing commands including the address data and the luminance data on the displaying area obtained by the graphics data producing processor 3.

Examples of the control of the sound processing include issuance of sound output commands to the sound processor 13, and designation of level, reverberation, and the like, and an example of the control of the internal processing includes an arithmetic operation responsive to the operation of the controller 22.

The outline of a game performed by this game system will now be described.

The game system performs a game imitating a ski-jumping competition, and a character imitating a competitor of the ski-jumping competition is displayed on a screen. Similarly to the actual ski-jumping competition, scores are calculated by the total of a distance score and a style score so that one game player plays the game aiming at a high score, or a plurality of game players compete with each other for scores by alternatively operating the controller 22.

Examples of displayed game picture will now be described with reference to FIGS. 2 to 5. FIGS. 2 to 5 illustrate game pictures in sequence from a start of one ski-jumping competition to immediately after the start of run-up.

As shown in FIGS. 2 to 5, a competitor 40 is located in substantially the center of the screen, and an approach 41 of a ski-jumping hill extends diagonally from upper right to lower left of the screen.

A reference score (for example, 180.0 in this embodiment) for clearing the game is displayed as "QUALIFY" at an upper left corner of the screen, a course record, i.e., the highest score (for example, the initial value is 205.4 in this embodiment) is displayed as "CR" immediately below thereof, and a competitor's number is displayed at a lower part of the screen.

A ring 42 and an arrow 43 inside thereof are displayed at an upper right corner of the screen, and wind speed is displayed immediately below thereof by numerical values. A triangular mark 44 is attached to the ring 42. The mark 44 indicates the forward direction of the competitor 40.

Figure 2:
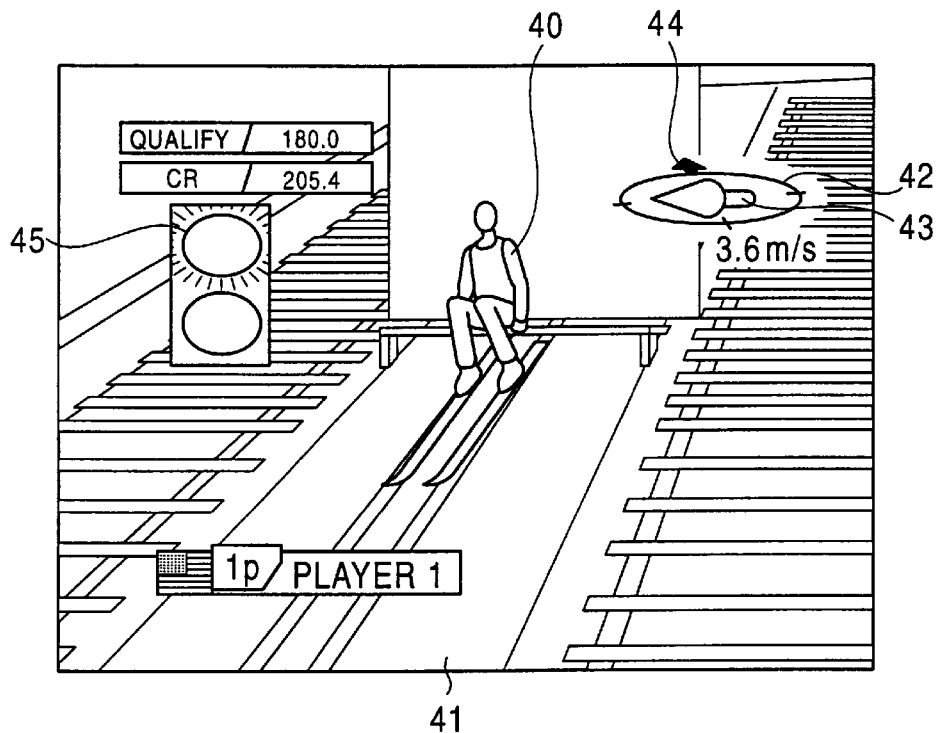
FIG. 2 illustrates a picture of a game.

The ring 42 and the arrow 43 are displayed in three dimensions in a state of being seen from the position similar to the visual point position with respect to the competitor 40. In FIG. 2, for example, the visual point position is located downward with respect to the competitor 40, and the ring 42 and the arrow 43 are similarly displayed in a state of being seen from below. Therefore, in FIG. 2, the mark 44 is attached to the upper portion of the ring 42.

Figure 5:
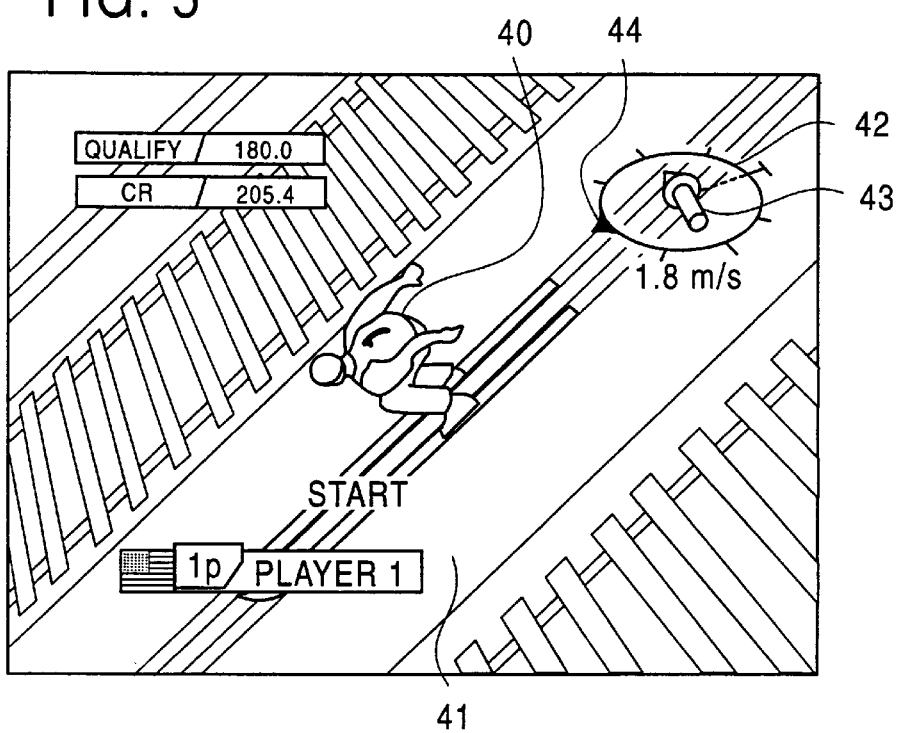
FIG. 5 illustrates a picture of the game.

In FIG. 5, for example, the visual point position is located upward with respect to the competitor 40, and the ring 42 and the arrow 43 are similarly displayed in a state of being seen from above. Therefore, the mark 44 is attached to a slightly lower portion of the left side of the ring 42.

In FIG. 2, a signal section 45 displayed on the left center of the screen is displayed only between the start of the game and immediately after the competitor 40 is instructed to start a run-up action (FIGS. 2 to 4), and indicates propriety of the start of the run-up. An upper lamp is illuminated in red in FIG. 2 to display that the start of run-up is not permitted, and a lower lamp is illuminated in blue in FIG. 3 to display that the start of the run-up is permitted.

The function of the CPU 1 will now be described with reference to FIGS. 2 to 14.

Figure 11:
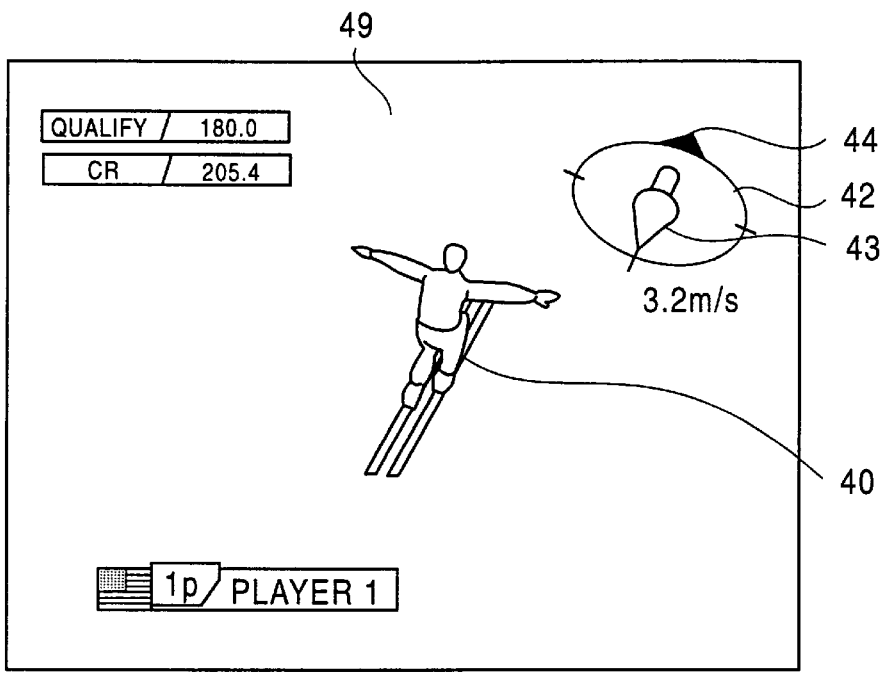
FIG. 11 illustrates a picture of the game.
Figure 12:
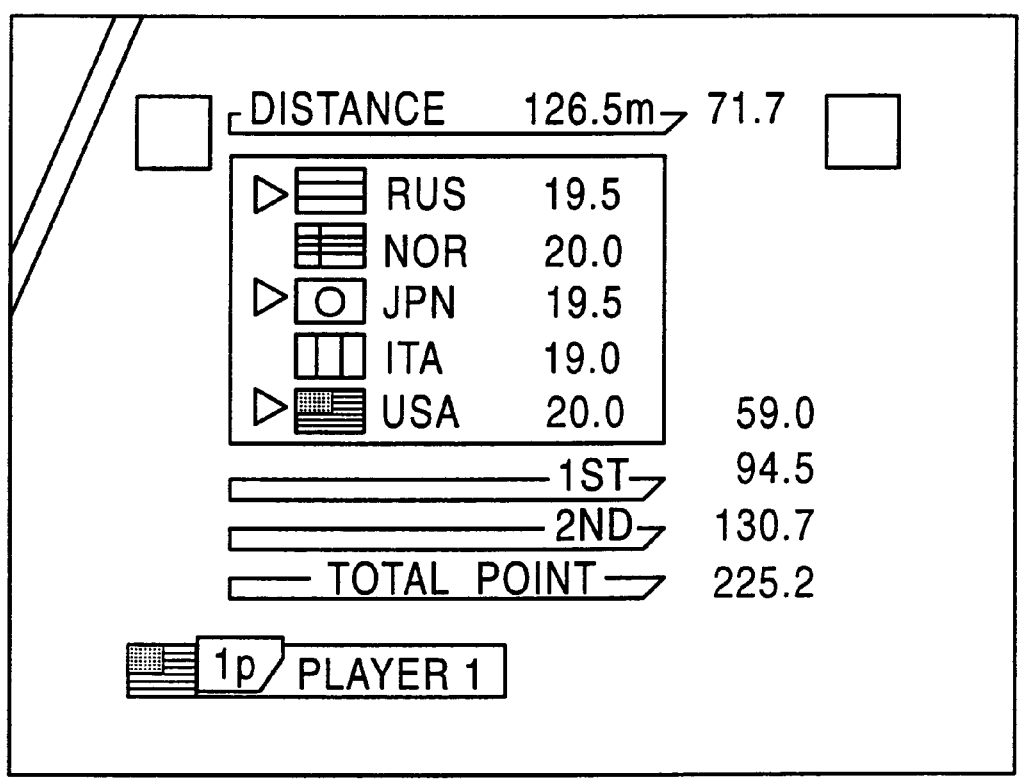
FIG. 12 illustrates a picture of the game.
Figure 13:
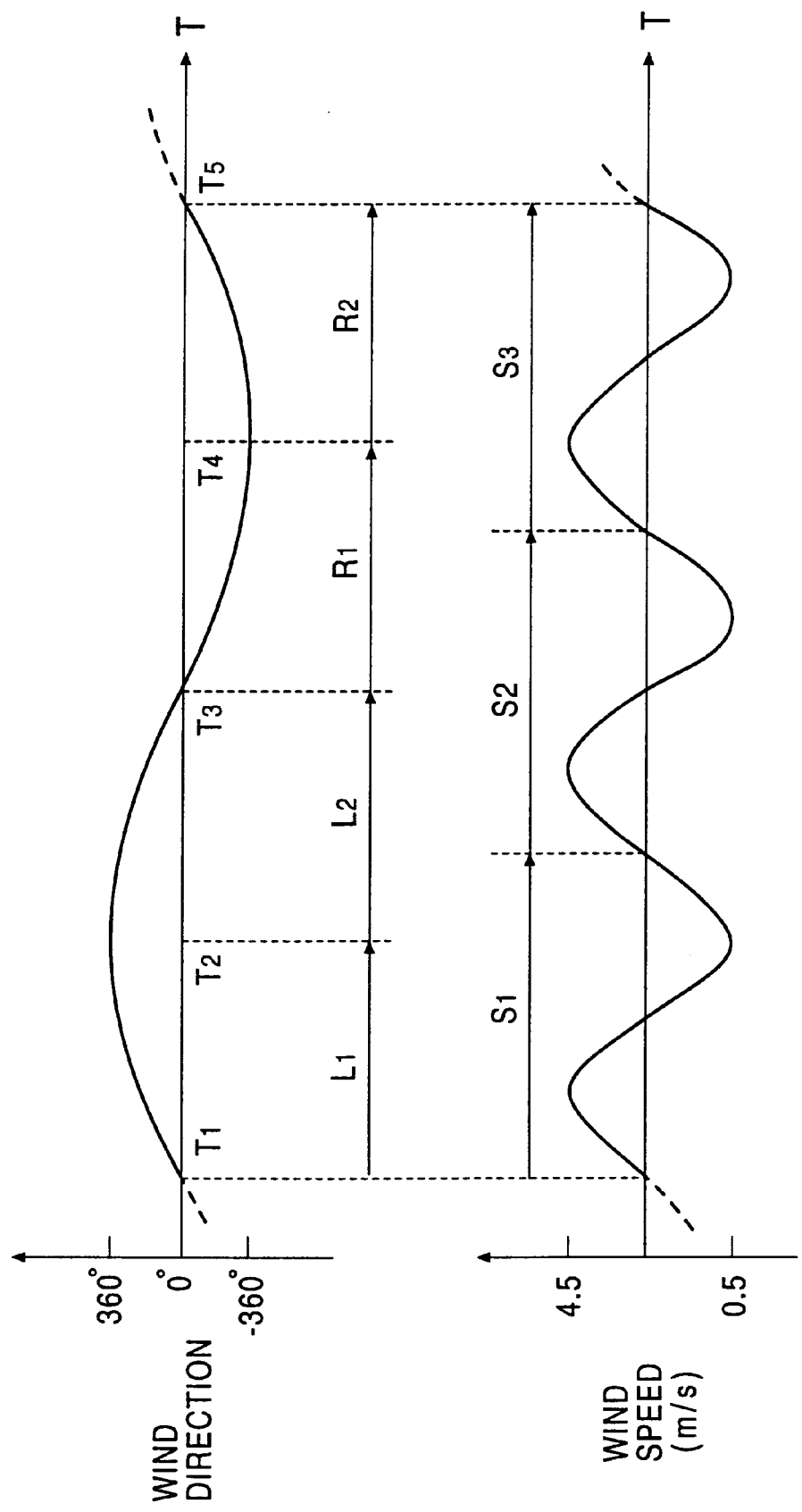
FIG. 13 is a time chart for the explanation of a calculation procedure of wind direction and wind speed.
Figure 14:
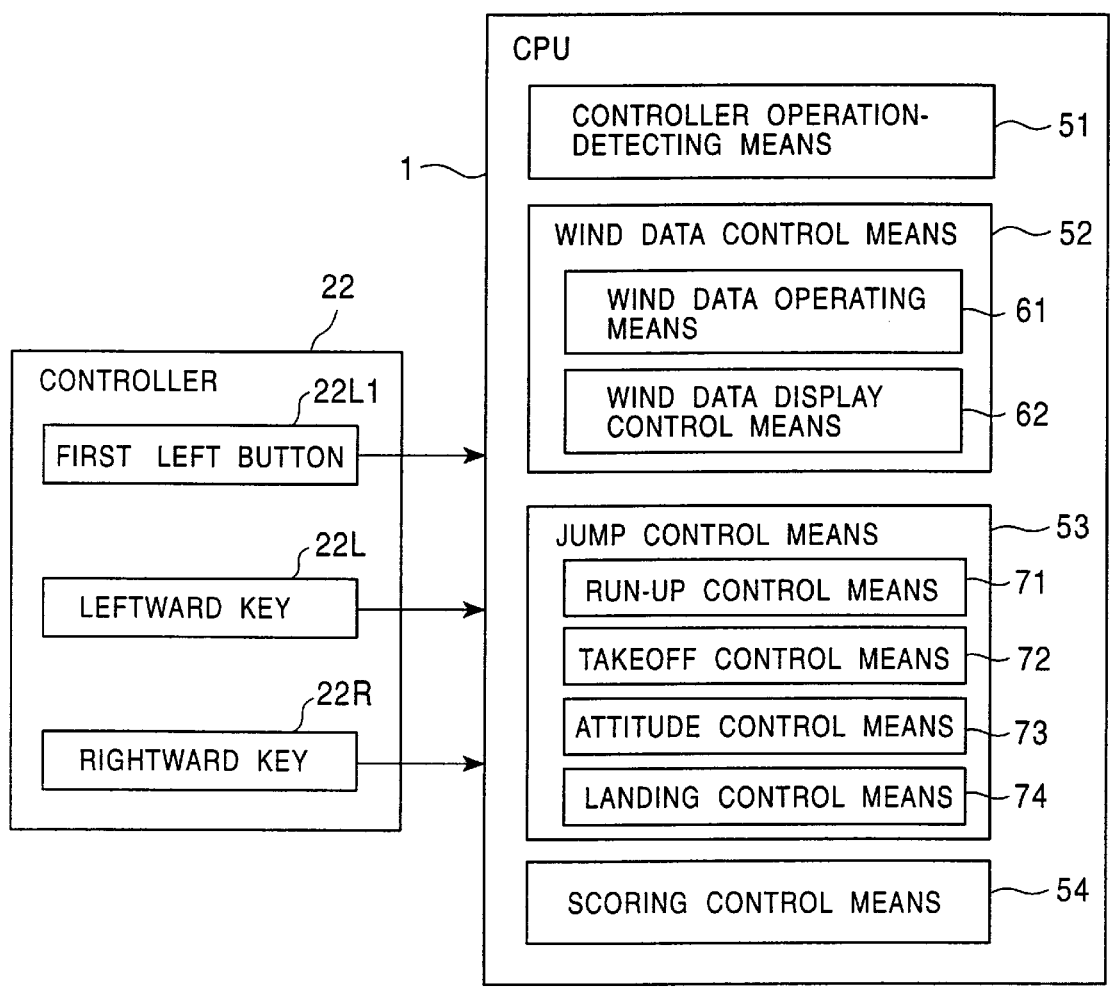
FIG. 14 is a block diagram showing a functional block of a CPU and a part of operation means of a controller.

FIGS. 6 to 12 illustrates game pictures in sequence of one ski-jumping competition, FIG. 13 is a time chart illustrating a calculation procedure of wind direction and wind speed, and FIG. 14 is a block diagram showing a functional block of the CPU 1 and a part of operation means of the controller 22. The interface circuit 20, the bus 2, and other operation means of the controller 22 are omitted for reasons of description.

As shown in FIG. 14, the CPU 1 includes controller operation-detecting means 51, wind data control means 52, jump control means 53 and scoring control means 54 as a functional block.

The controller operation-detecting means 51 detects on-off of the operations to each of operation means of the controller 22.

The wind data control means 52 includes wind data operating means 61 and wind data display control means 62, and controls wind direction and wind speed. When takeoff instructing means (for example, the first left button 22L1 in this embodiment) to be described later is operated, the means 52 fixes the wind direction and wind direction to those at that point of time.

The wind data operating means 61 obtains the wind direction and wind speed. The wind direction goes round two times clockwise after going round three times counter-clockwise to constitute one cycle, and this one cycle is set to the time (for example, about 14 seconds) shorter than a time limit $t_1$ (15 seconds in this embodiment) to be described later at which the run-up can be started.

The wind direction is set so as to change in the form of a sine curve, as shown in FIG. 13. In FIG. 13, the wind directions at each of the points of time $T_1$, $T_2$, $T_3$ and $T_4$ represent a head wind against the competitor, that is, a wind headed toward the competitor from the front of the approach of the ski-jumping hill. A period L1 represents the counter-clockwise first round, a period L2 represents the counter-clockwise second round, a period R1 represents the clockwise first round, and a period R2 represents the clockwise second round. One cycle is started at the point of time $T_1$, and one cycle is completed and the next one cycle is started at the point of time $T_5$.

The point of time at which the start of the run-up has been permitted is not fixed to the point of time $T_1$ of the wind direction, and the change of the wind is started from a random point of time in one cycle.

The wind speed is also set so as to change in the form of a sine wave, as shown in FIG. 13, and changes by three cycles of S1, S2 and S3 in response to one cycle of the wind direction. In this embodiment, the maximum value thereof is set to 4.5 m/s, and the minimum value thereof is set to 0.5 m/s.

Returning to FIG. 14, the wind data display control means 62 displays a wind direction guide indicating the wind direction and a wind speed guide indicating the wind speed, which are obtained by the wind data operating means 61, on the screen. The wind direction guide, as shown in FIG. 2 for example, uses the arrow 43, indicates a side wind from left to the competitor 40 in FIG. 2, and indicates a side wind from right to the competitor 40 in FIG. 3.

The wind speed guide displays numerical values, and displays the wind speed by the thickness of the arrow 43. For example, the arrow 43 is thick at a wind speed of 4.4 m/s in FIG. 3, and the arrow 43 is thin at a wind speed of 1.8 m/s in FIG. 5.

Returning to FIG. 14, the jump control means 53 includes run-up control means 71, takeoff control means 72, attitude control means 73 and landing control means 74, and controls a jump action of the competitor.

The run-up control means 71 controls the start of the run-up action, and has the following functions 1) to 3).

Figure 3:
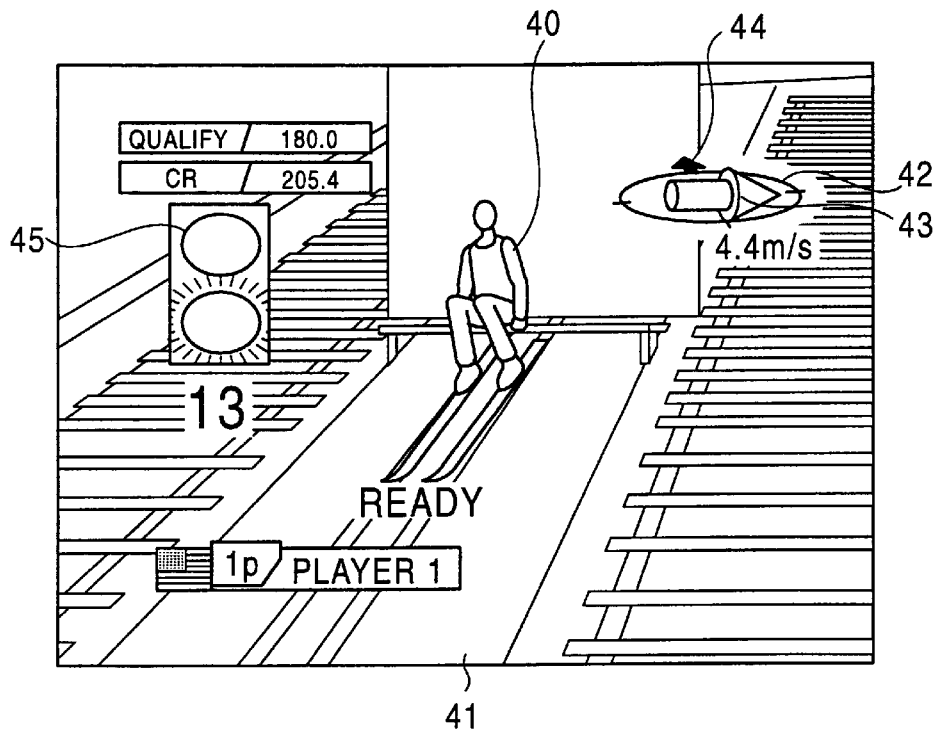
FIG. 3 illustrates a picture of the game.

1) Illuminating the lower lamp of the signal section 45 in blue, i.e., increasing luminance, thereby informing that the run-up can be started, as shown in FIG. 3.

2) Allowing the competitor 40 to start the run-up when run-up instructing means (for example, the first left button 22L1 in this embodiment) is operated.

3) Setting the time limit $t_1$ (15 seconds) from the point of time at which the run-up can be started as the time at which the start of the run-up can be instructed, informing that the run-up can be started by means of the signal section 45, and displaying a remaining time in which the start of the run-up can be instructed below the signal section 45. FIG. 3 shows that the time remaining is 13 seconds.

The game pictures in FIGS. 4 to 7 will now be described.

Figure 4:
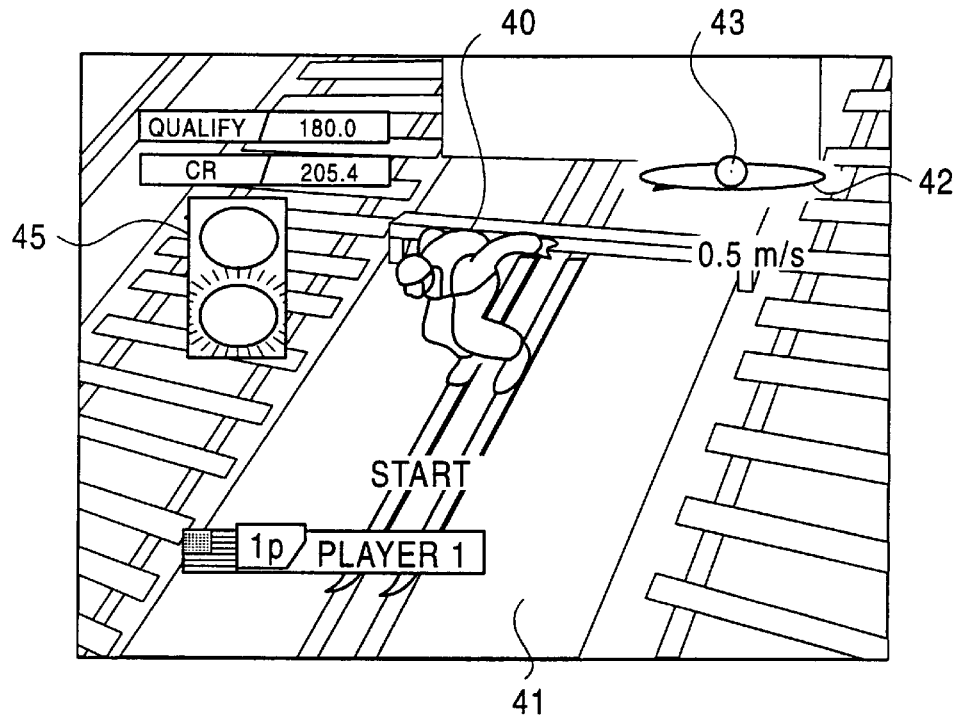
FIG. 4 illustrates a picture of the game.

The game picture in FIG. 4 shows the state immediately after the start of the run-up, and the signal section 45 is displayed. In FIG. 4, the visual point position is set to substantially the same height as that of the competitor 40. The upper right corner ring 42 is seen in substantially horizontal, the arrow 43, i.e. the wind direction is substantially a fair wind to the competitor 40, and the wind speed is 0.5 m/s.

The game picture in FIG. 5 shows a state somewhat advanced from the state shown in FIG. 4, and the visual point position is set above the competitor 40. The mark 44 points diagonally towards the lower left in which the competitor 40 advances, the wind direction is a side wind from left to the competitor 40, and the wind speed is 1.8 m/s.

Figure 6:
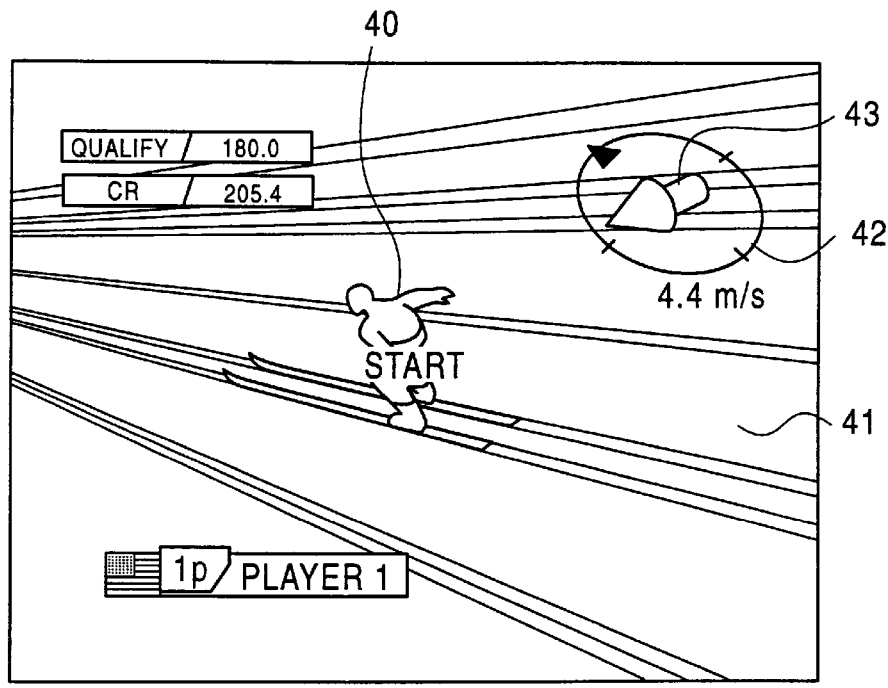
FIG. 6 illustrates a picture of the game.
Figure 7:
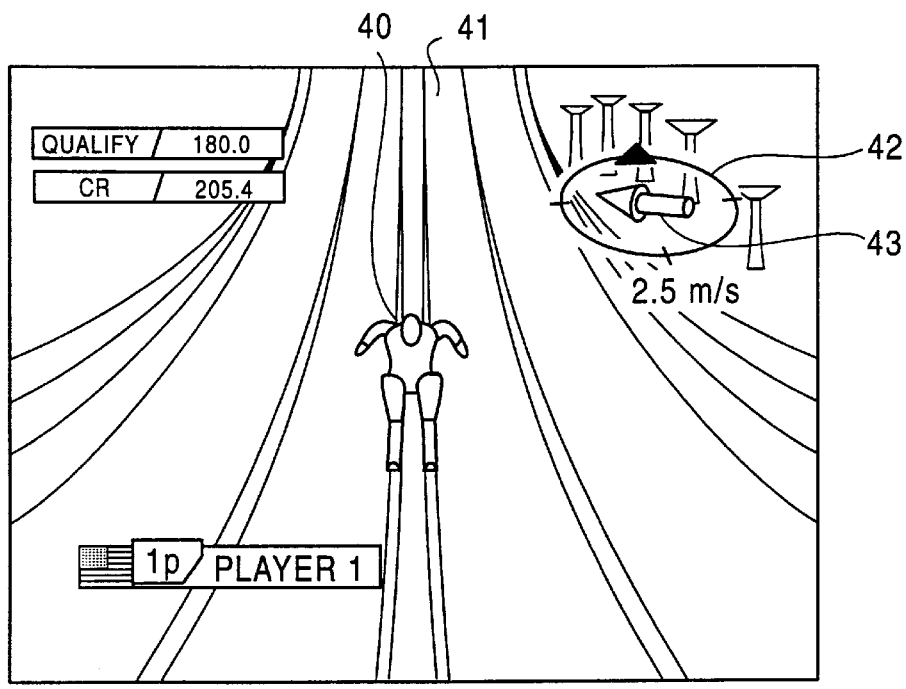
FIG. 7 illustrates a picture of the game.

The game pictures in FIGS. 6 and 7 show further advanced states. The wind direction is a side wind from right to the competitor 40 and the wind speed is 4.4 m/s in FIG. 6, and the wind direction is a side wind from right to the competitor 40 and the wind speed is 2.5 m/s.

Returning to FIG. 14, the takeoff control means 72 controls a takeoff action of the competitor, and has the following functions 1) to 4).

Figure 8:
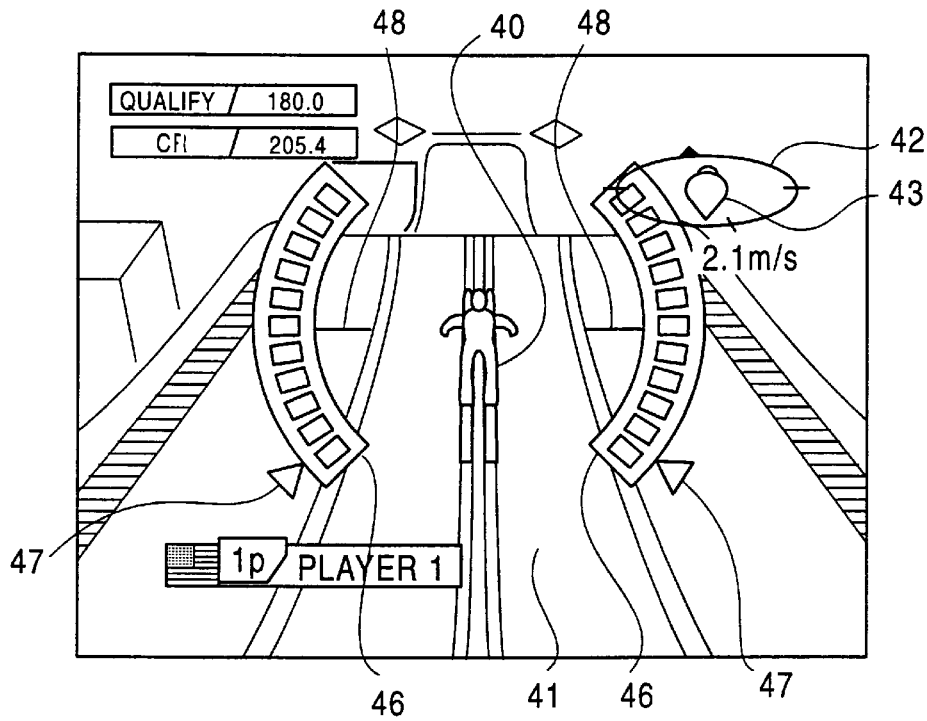
FIG. 8 illustrates a picture of the game.

1) Displaying fan-shaped gages 46 on both sides of the approach 41 when the competitor 40 reaches a takeoff-capable position, and displaying takeoff marks 47 outside of both lower ends of the gages 46, thereby informing that the takeoff is possible, as shown in FIG. 8.

2) Moving the takeoff marks 47 upward along the outer periphery of the gages 46 when takeoff instructing means (for example, the first left button 22L1 in this embodiment) is operated and turned on after displaying the gages 46.

3) When the operation to the turned-on first left button 22L1 is released to be turned off, the off-signal is regarded as the takeoff instructing signal, and the competitor is allowed to perform a takeoff action at a jumping-out angle in response to the positions of the takeoff marks 47 in this point of time.

In this case, the takeoff marks 47 reach the upper ends of the gages 46 in a short period of time (for example, about one second). If the first left button 22L1 is not turned off during this period of time, the jump action is performed at a preset low jumping-out angle when the takeoff marks 47 reach the upper ends.

The jumping-out angle is set to the best angle when the takeoff marks 47 are located near the center portions of the gages 46, and is set to a low angle when located near the lower ends and the upper ends.

Figure 9:
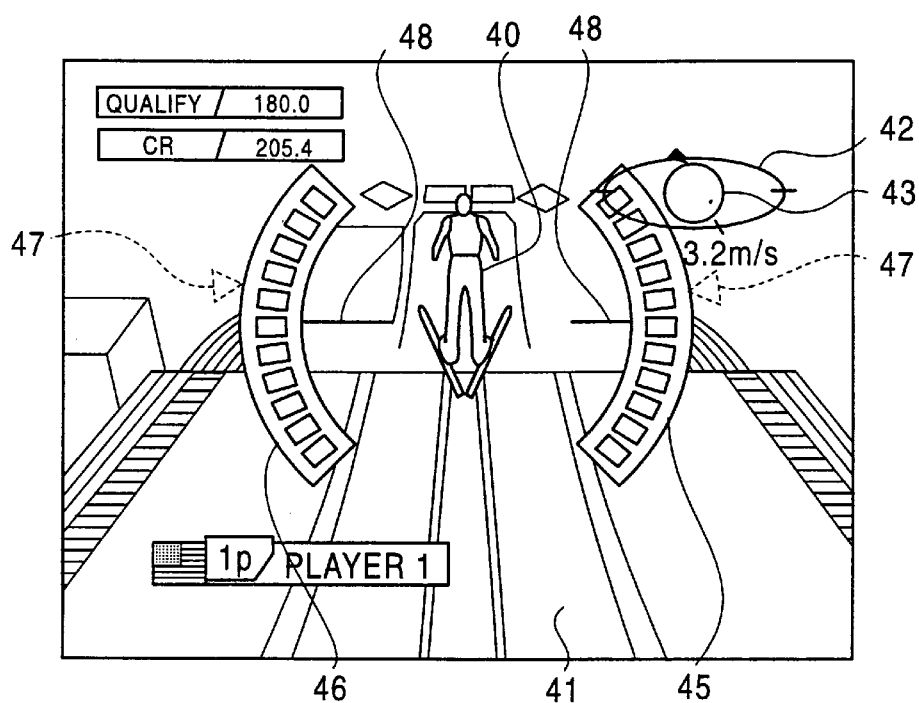
FIG. 9 illustrates a picture of the game.

As shown in FIG. 9, which is a picture of the state immediately after the takeoff, when the off signal is output and the takeoff action is performed, the takeoff marks 47 are stopped and the luminance thereof is lowered.

The wind direction is a head wind diagonally from the front right to the direction in which the competitor 40 advances in FIG. 8, and is a head wind slightly diagonally from the front right in FIG. 9. As described above, at the point of time where the off-signal obtained when the on-state first left button 22L1 is turned off is output, the wind direction and wind speed are fixed, and the wind direction and the wind speed shown in FIG. 9 are maintained during the flight of the competitor.

4) Counting an elapsed time from the point of time where the competitor reaches the takeoff-capable position, and allowing the competitor 40 to perform the jump action at a preset low jumping-out angle when a predetermined time $t_2$ has elapsed.

Returning to FIG. 14, the attitude control means 73 controls the attitude of the competitor, that is, the flight direction during the flight of the competitor, controls the height of the competitor in response to the flight direction, and has the following functions 1) to 4).

1) Displaying balance marks 48 simultaneously when the gages 46 are displayed, and controlling the display positions thereof, as shown in FIG. 8.

Figure 10:
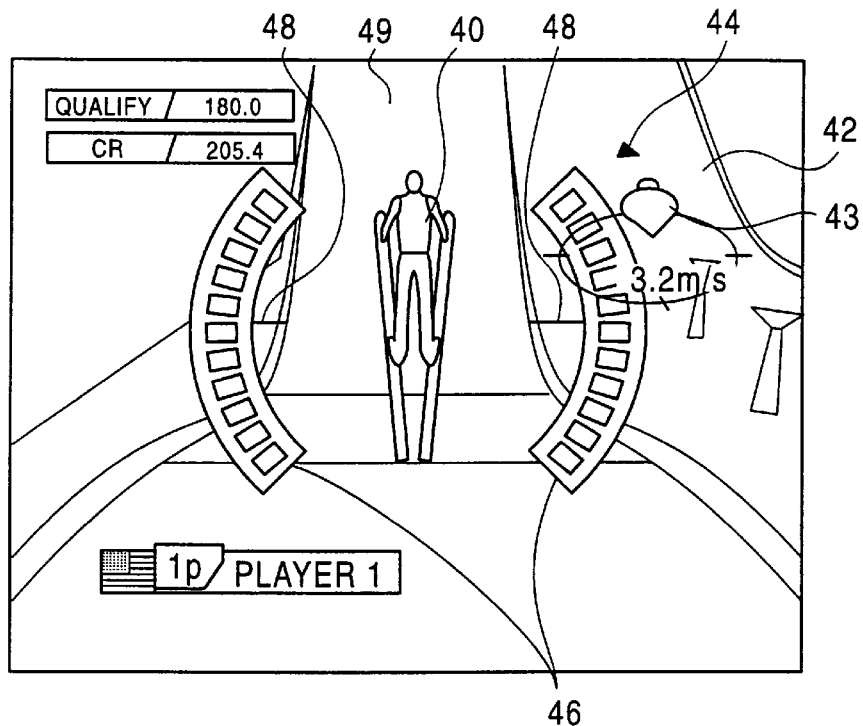
FIG. 10 illustrates a picture of the game.

The balance marks 48 represent the attitude, that is, the flight direction of the competitor 40. In FIG. 10, a slightly left-inclined state is shown by the balance marks 48. FIG. 10 is a game picture showing a state where the competitor 40 is flying and is approaching landing. A landing slope 49 is displayed in front of (upward in the drawing) the competitor 40.

2) Changing the flight direction of the competitor in flight in response to the wind direction and wind speed fixed at the time of the takeoff.

For example, suddenly directing the competitor leftward when the competitor is receiving a side wind of 4.5 m/s from rightward, and gently directing the competitor leftward when the competitor is receiving a side wind of 0.5 m/s from the rightward.

3) Correcting the flight direction of the competitor by turning on the leftward key 22L and the rightward key 22R.

For example, if the rightward key 22R (FIG. 14) is turned on when the left balance mark 48 lowers and the competitor is directed leftward, as shown in FIG. 10, the direction of the competitor is corrected in the rightward direction. Therefore, the leftward and rightward keys 22L and 22R can be operated using the display positions of the balance marks 48 as a guide.

4) Controlling the height of the competitor with influences of the wind direction and wind speed, and the flight direction of the competitor obtained from corrected conditions by the leftward and rightward keys 22L and 22R, thereby providing a function as flight distance control means for controlling the flight distance (hereinafter, referred to as "the distance jumped") of the ski-jumping.

This lowers the distance jumped unless the flight direction is straight, and the distance jumped is controlled.

Returning to FIG. 14, the landing control means 74 controls the landing of the jumped competitor, and has the following functions 1) to 3).

1) Detecting the height of the competitor in flight, i.e., the ground distance D.

2) Displaying the shadow of the ski reflected on snow surface when the ground distance D decreases to a predetermined value or less. This allows the game player to perform a landing operation while viewing the shadow.

3) Allowing the competitor to perform landing when landing instruction means (for example, the first left button 22L1 in this embodiment) is turned on.

A landing posture is determined by the ground distance D of the competitor and the flight direction of the competitor, i.e., the angle of inclination of the balance marks 48 at the point of time where the first left button 22L1 is turned on.

For example, when the ground distance D is a predetermined value or more and the balance marks 48 are substantially in horizontal, the competitor is allowed to land in a telemark position, as shown in FIG. 11.

In addition, when the balance marks are inclined even if the ground distance D is a predetermined value or more, or when the ground distance D is less than the predetermined value even if the balance marks 48 are horizontal, the competitor stumbles at the time of landing.

Further, when the ground distance D is less than the predetermined value and the balance marks 48 are inclined, the competitor is forced to fall down at the time of landing.

In this embodiment, a total of five stages of landing posture are set: landing in a telemark position, two stages of landing in a stumbling state, and two stages of landing in a falling-down state.

Returning to FIG. 14, the scoring control means 54 calculates, similarly to an actual ski-jumping competition, the scores of the competitor with a distance score that is set according to the distance jumped and a style score that is set according to a style such as a flight attitude and a landing posture. The scoring control means 54 adopts the programmed scoring that is based on the actual scoring rule.

As shown in FIG. 12, the scoring control means 54 displays scoring results on the screen. In this game, trial jumping is performed two times, similarly to an actual ski-jumping competition, and the total points thereof are displayed as "TOTALPOINT".

The run-up start timing will now be described with reference to FIG. 13.

In this embodiment, the time between the start of a run-up and the takeoff action is substantially constant because the distance of the approach is constant. Therefore, since the wind direction and wind speed periodically change in the form of a sine curve, as shown in FIG. 13, the wind direction and wind speed during the flight of the competitor, which are fixed at the time of takeoff, depend on the wind direction and wind speed at the time of start of the run-up.

In this embodiment, one cycle of time for changing the wind direction shown in FIG. 13 is set with respect to the time between the start of the run-up and the takeoff action so that the wind direction and wind speed fixed at the time of takeoff are identical to those at the time of start of the run-up.

In general, the distance jumped increases when the wind during the flight of the competitor is a head wind and the wind speed is high to some extent. Therefore, in this embodiment, the setting is adjusted so that the distance jumped reaches maximum when the wind direction is a direct head wind and the wind speed reaches maximum.

On the other hand, since the wind direction changes in the form of a sine curve, as shown in FIG. 13, the amount of change in the wind direction, i.e., the rotation speed of the wind direction lowers near the points of time $T_2$ and $T_4$. That is, the wind direction slowly changes at the two points of time in the head wind.

The wind speed is 2.5 m/s at the point of time $T_1$, 0.5 m/s at the point of time $T_2$, 2.5 m/s at the point of time $T_3$, 4.5 m/s at the point of time $T_4$, and 2.5 m/s at the point of time $T_5$ similarly to the point of time $T_1$.

In other words, since the change in the wind speed is set to three cycles responsive to one cycle of the change in wind direction, three types of wind speed, 0.5 m/s, 2.5 m/s, and 4.5 m/s, are set in response to each of the points of time even though the wind direction is the same head wind.

In addition, the time limit (15 seconds in this embodiment) which enables the start of the run-up is counted from a random point of time in one cycle of FIG. 13 in each of the competitions.

Therefore, the player instructs the start of the run-up while viewing the direction and thickness of the arrow 43 when the wind direction is a head wind and the wind speed reaches the maximum, i.e., at the point of time $T_4$, thereby extending the distance jumped to the maximum. That is, the display of the wind direction and wind speed indicated by the direction and the thickness of the arrow 43 functions as a prediction guide to the player.

In addition, since the amount of change in the wind direction lowers at the point of time $T_4$, the start of the run-up can be easily instructed, whereby the distance jumped can be extended and interest of the video game can be enhanced.

According to this embodiment, the wind direction guide indicating the wind direction and the wind speed guide indicating the wind speed each serving as a prediction guide are displayed so as to increase or decrease the distance jumped in response to the run-up start timing. Therefore, the scoring results fluctuate according to suitability of the run-up start operation, so that competitive characteristics of the video game can be enhanced and the interest of the game can be enhanced.

Figure 15:
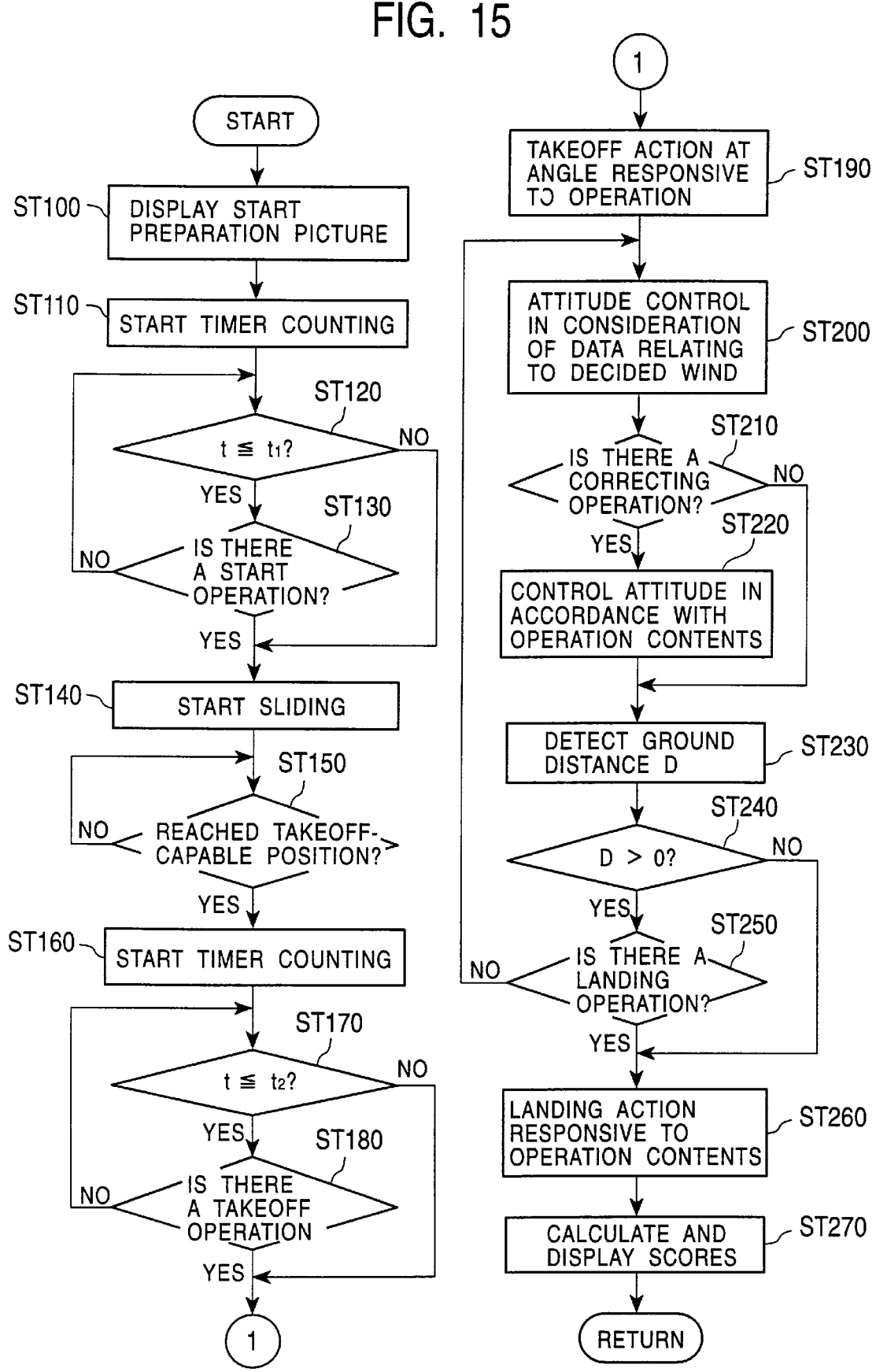
FIG. 15 is a flow chart showing an operation procedure.

Operation procedures of the game will now be described with reference to the flow chart of FIG. 15 while suitably referring to the game pictures.

When the start button 22a is turned on, the game is started. First, the competitor sits down at a start position and a start preparation picture shown in FIG. 2 is displayed (step ST100).

Then, counting of the elapsed time is started from the time when the start of the run-up has become possible (step ST110), and then the counted time t is checked to determine whether or not it has reached a time limit $t_1$ (step ST120). When $t \leq t_1$, it is determined whether or not there is a run-up start operation (step ST130). When there is no such operation, the procedure returns to step ST120, and the procedure advances to step ST140 when there is a run-up start operation.

When $t > t_1$ in step ST110, the procedure directly advances to step ST140 to start the run-up (step ST140).

Then, it is determined whether or not the competitor reaches a takeoff-capable position (step ST150), and the run-up is continued until the competitor reaches the position.

When the competitor reaches the takeoff-capable position, counting of the elapsed time is started from the point of time (step ST160), and the counted time t is checked to determine whether or not it has reached a predetermined time $t_2$ (step ST170). When $t \leq t_2$, it is determined whether or not there is an operation for a takeoff action (step ST180). When there is no such an operation, the procedure returns to ST170, and the procedure advances to step ST190 when there is such an operation.

When $t > t_2$ in step ST170, the procedure directly advances to step ST190 to perform the takeoff action at a jumping-out angle responsive to the takeoff operation (step ST190).

Then, the attitude of the competitor is controlled in consideration of the data relating to the decided wind (step ST200), and it is determined whether or not an attitude correcting operation is performed by the leftward and rightward keys 22L and 22R (step ST210). When the correcting operation is performed, the attitude is controlled in accordance with the operation contents (step ST220) and the procedure advances to step ST230.

When the correcting operation is not performed, the procedure directly advances to step ST230 to detect the ground distance D of the competitor (step ST230), and it is determined whether or not the competitor makes a landing (step ST240).

When D>0, i.e., the competitor is still flying, it is determined whether or not a landing operation is performed (step ST250). When the landing operation is not performed, the procedure returns to step ST200, and the procedure advances to step ST260 when the landing operation is performed.

When $D \leq 0$ in step ST240, the procedure directly advances to step ST260 to perform a landing action responsive to the operation contents (step ST260).

Then, a scoring is performed, and the results thereof are displayed, as shown in FIG. 12 (step ST270) to complete the procedure.

In this embodiment, since a trial jump is performed two times, as described above, the display of the scoring results in step ST270 is performed after the completion of the second jump.

Figure 16:
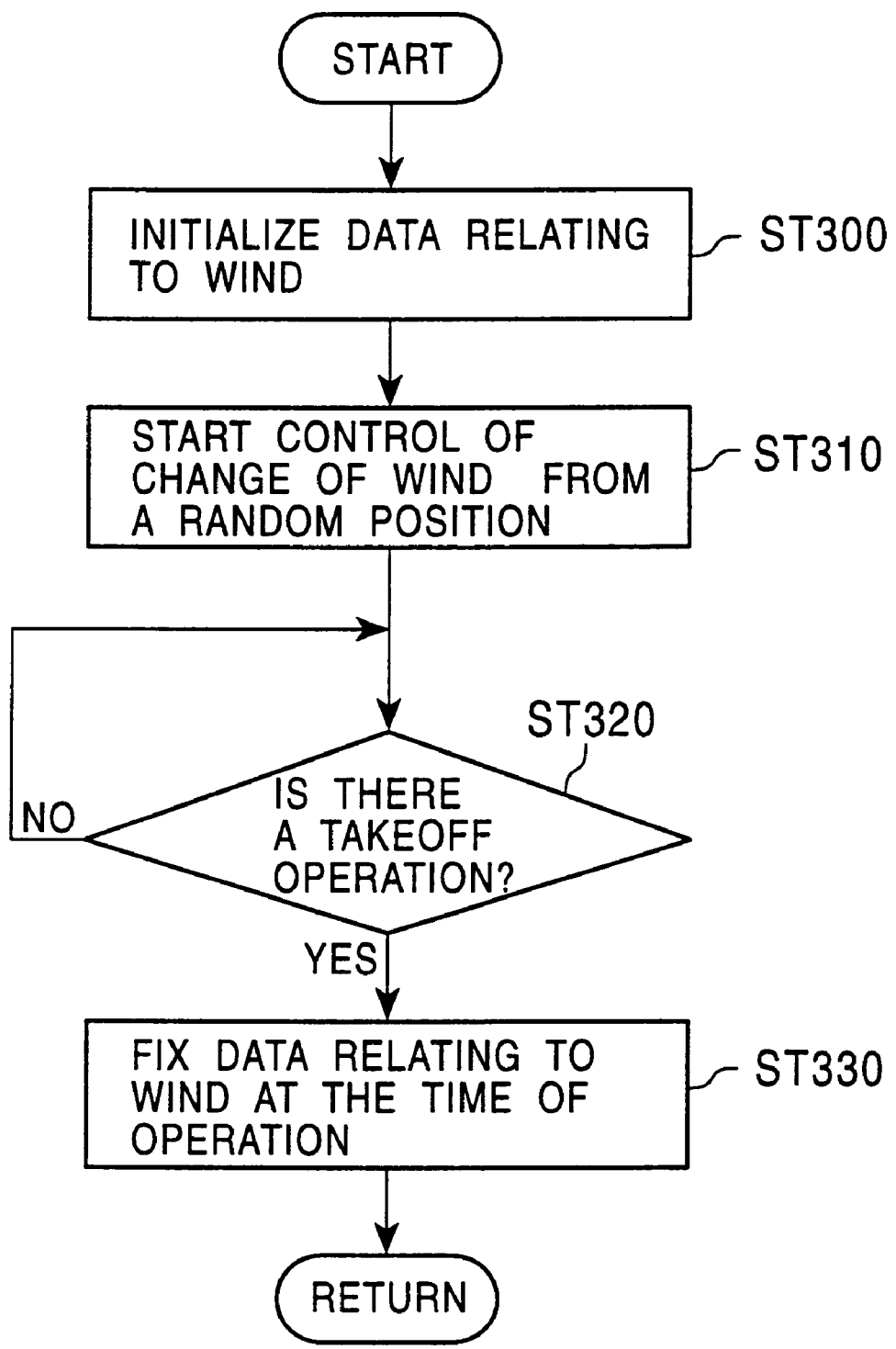
FIG. 16 is a flow chart showing a determination procedure of data relating to wind, consisting of wind direction and wind speed.

A determination procedure of data relating to wind consisting of wind direction and wind speed will now be described with reference to the flow chart of FIG. 16.

When the start button 22a is turned on, the game is started, and the data relating to the wind is first initialized (step ST300).

Then, control of change of the data relating to the wind is started from a random point of time in one cycle shown in FIG. 13 (step ST310).

A determination is made of whether or not the takeoff operation is performed (step ST320), and the determination action is continued until the takeoff operation is performed. When the takeoff operation is performed, the data of the wind direction and wind speed at the time of the operation is fixed (step ST330) to complete the procedure.

In the present invention, a mark indicating the change in wind direction and serving as a prediction guide, for example, a mark going around the ring 42 may be used as the wind direction guide for displaying the wind direction.

In addition, the wind speed may be indicated by changes in color and changes in luminance.

Furthermore, the wind direction may be rotated in, for example, a half revolution only, i.e., only in the direction of 180°. In this case, a mark reciprocating on a bar may be used as the wind direction guide.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video game apparatus in which a simulated ski-jumping field is displayed on a game picture, a character of a game is allowed to start a run-up from a start point, to perform a takeoff action at a takeoff position, and to jump so as to compete for a flight distance, said apparatus comprising:

wind direction setting means for setting a wind direction that changes according to preset change contents;

wind direction guide display control means for displaying a wind direction guide indicating said set wind direction on a part of the game picture;

run-up instruction means for instructing said character to start the run-up action; and flight distance control means for changing the flight distance in response to the wind direction at the point of time of the takeoff action.

2. A video game apparatus according to claim 1, wherein said wind direction setting means rotates the wind direction.

3. A video game apparatus according to claim 1, further comprising wind speed setting means for setting a wind speed that changes according to preset change contents, wherein said wind direction guide display control means further displays a wind speed guide indicating said set wind speed on a part of the game picture; and wherein said flight distance control means further changes the flight distance in response to a wind speed at the point of time of the takeoff action.

4. A video game apparatus according to claim 3, wherein said wind speed setting means sets change contents thereof so as to be in a fixed relationship with the change contents of the wind direction.

5. A video game apparatus according to claim 3, wherein said wind direction guide display control means displays an arrow mark as said wind direction guide, and changes the shape of the arrow mark in response to said wind speed.

6. A video game apparatus according to claim 5, wherein said wind direction setting means reduces an amount of change in the wind direction at the point of time of the takeoff action.

7. A video game apparatus according to claim 1, further comprising takeoff instruction means for instructing said character to perform the takeoff action.

8. A prediction guide displaying method for use in a video game in which a simulated jumping field is displayed on a game picture, a character is allowed to start a run-up from a start point, to perform a takeoff action at a takeoff position, and to jump so as to compete for a flight distance, said method comprising the steps of:

displaying a wind direction guide indicating a wind direction which changes according to preset change contents on a part of a game picture;

instructing said character to start a run-up action; and changing the flight distance in response to the wind direction at the point of time of the takeoff action.

9. A recording medium recording therein a prediction guide display program, said prediction guide display program being used in a video game in which a simulated jumping field is displayed on a game picture, a character of the game is allowed to start a run-up from a start point, to perform a takeoff action at a takeoff position, and to jump so as to compete for a flight distance, and said program comprising the steps of:

setting a wind direction which changes according to preset change contents;

displaying a wind direction guide indicating said set wind direction on a part of a game picture;

instructing said character to start a run-up action; and changing the flight distance in response to the wind direction at the point of time of the takeoff action.

* * * * *